(12) United States Patent
Singh et al.

(10) Patent No.: US 10,291,661 B2
(45) Date of Patent: May 14, 2019

(54) METHOD AND SYSTEM FOR CALL ROUTING

(71) Applicant: iBasis, Inc., Lexington, MA (US)

(72) Inventors: Manpreet Singh, Ellington, CT (US); Hwan Jang Tang, Concord, MA (US); James W. Lotti, Wellfleet, MA (US)

(73) Assignee: iBasis, Inc., Lexington, MA (US)

( * ) Notice: Subject to any disclaimer, the term of this patent is extended or adjusted under 35 U.S.C. 154(b) by 249 days.

(21) Appl. No.: 14/212,851

(22) Filed: Mar. 14, 2014

(65) Prior Publication Data

US 2014/0269681 A1    Sep. 18, 2014

Related U.S. Application Data

(60) Provisional application No. 61/802,206, filed on Mar. 15, 2013.

(51) Int. Cl.
*H04L 29/06* (2006.01)
*H04M 15/00* (2006.01)

(52) U.S. Cl.
CPC ........ *H04L 65/1069* (2013.01); *H04M 15/41* (2013.01); *H04M 15/56* (2013.01); *H04M 15/8044* (2013.01)

(58) Field of Classification Search
None
See application file for complete search history.

(56) References Cited

U.S. PATENT DOCUMENTS

| 7,206,582 B2 | 4/2007 | Tom et al. |
| 7,436,936 B2 | 10/2008 | Terpstra et al. |
| 7,519,074 B2 | 4/2009 | Ward et al. |
| 7,706,785 B2 | 4/2010 | Lei et al. |

(Continued)

FOREIGN PATENT DOCUMENTS

| WO | WO 2006/091820 A2 | 8/2006 |
| WO | WO 2011/100238 | 8/2011 |
| WO | WO 2014/144328 | 9/2014 |

OTHER PUBLICATIONS

Camarillo, J., et al., "Functionality of Existing Session Border Controller (SBC)," (2005).

(Continued)

*Primary Examiner* — Peter P Chau
*Assistant Examiner* — Mariela Vidal Carpio
(74) *Attorney, Agent, or Firm* — Hamilton, Brook, Smith & Reynolds, P.C.

(57) ABSTRACT

In an embodiment, a method and corresponding apparatus of managing call routing includes sending a first message by a session border controller (SBC) to a routing engine, the first message including event information indicative of an event related to a call, the event being associated with a second message received by the SBC; receiving a response message including call managing information related to the call, the call managing information being determined based on at least part of the event information, the call managing information to be returned to the routing engine in a subsequent message related to the call; and maintaining the call managing information received in the response message, the call managing information to be returned to the routing engine in a subsequent message related to the call.

34 Claims, 4 Drawing Sheets

(56) References Cited

U.S. PATENT DOCUMENTS

| | | |
|---|---|---|
| 7,830,861 B2 | 11/2010 | Afshar et al. |
| 8,223,717 B2 | 7/2012 | Dillon et al. |
| 8,228,901 B2 | 7/2012 | Meranchik |
| 8,265,250 B2 | 9/2012 | Malas et al. |
| 2002/0131362 A1* | 9/2002 | Callon ................ G06F 11/2294 370/216 |
| 2004/0042469 A1* | 3/2004 | Clark ...................... H04L 45/36 370/401 |
| 2006/0146783 A1* | 7/2006 | Yurchenko .......... H04L 12/2856 370/351 |
| 2006/0146784 A1* | 7/2006 | Karpov ............... H04L 12/2856 370/351 |
| 2006/0285493 A1* | 12/2006 | Manuja ............. H04L 29/06027 370/235 |
| 2008/0291901 A1 | 11/2008 | Stratton et al. |
| 2008/0304495 A1 | 12/2008 | Jackson et al. |
| 2008/0317001 A1 | 12/2008 | Jackson |
| 2010/0054259 A1 | 3/2010 | Khan |
| 2010/0175122 A1 | 7/2010 | Ballard |
| 2010/0211689 A1 | 8/2010 | Bijwaard et al. |
| 2011/0066707 A1 | 3/2011 | Brunson et al. |
| 2011/0188494 A1 | 8/2011 | Johnson et al. |
| 2011/0194554 A1* | 8/2011 | Gavita ................ H04L 65/1016 370/352 |
| 2011/0200033 A1* | 8/2011 | Tang ........................ H04M 3/42 370/352 |
| 2011/0317689 A1 | 12/2011 | MeLampy et al. |
| 2012/0066731 A1* | 3/2012 | Vasquez ................. H04N 7/141 725/106 |
| 2012/0226812 A1 | 9/2012 | Ren et al. |
| 2013/0128883 A1* | 5/2013 | Lawson .............. H04M 1/2473 370/352 |
| 2014/0153562 A1* | 6/2014 | Bucko ................. H04L 12/6418 370/352 |
| 2017/0013025 A1* | 1/2017 | Shakhov ............. H04L 65/1046 |

OTHER PUBLICATIONS

Burger, E., et al., "Message Context for Internet Mail," (2003).
Notification of Transmittal of the International Search Report and the Written Opinion of the International Searching Authority, or the Declaration, for PCT/US2014/028687, dated Jun. 13, 2014.
Kolberg, M. et al., "Managing Distributed Feature Interactions in Enterprise SIP Application Servers," IEEE International Conference on Communications, 2009. ICC '09, pp. 1-6.

* cited by examiner

METHOD AND SYSTEM FOR CALL ROUTING

RELATED APPLICATION

This application claims the benefit of U.S. Provisional Application No. 61/802,206, filed on Mar. 15, 2013. The entire teachings of the above application are incorporated herein by reference.

BACKGROUND

In Internet telephony, least cost routing is a process that provides customers with inexpensive telephone calls. Providers offering routes to destinations are selected, evaluated, and removed based on call quality and other measures to maintain a competitive cost base and acceptable call quality. A provider is selected from a set of providers represented by a routing table maintained in a routing engine. The routing table includes a cost of each provider offering a route to the destination that enables least cost routing.

SUMMARY

In an embodiment, a method and corresponding apparatus of managing call routing includes receiving, at a routing engine, a first message from a session border controller (SBC), the first message including event information indicative of an event related to a call, the event being associated with a second message received by the SBC; generating a response message including call managing information related to the call, the call managing information being determined based on at least part of the event information, the call managing information to be returned to the routing engine in a subsequent message related to the call; and sending the response message to the SBC.

In an embodiment, a method and corresponding apparatus of managing call routing includes sending a first message by a session border controller (SBC) to a routing engine, the first message including event information indicative of an event related to a call, the event being associated with a second message received by the SBC; receiving a response message including call managing information related to the call, the call managing information being determined based on at least part of the event information, the call managing information to be returned to the routing engine in a subsequent message related to the call; and maintaining the call managing information received in the response message, the call managing information to be returned to the routing engine in a subsequent message related to the call.

The call managing information may be included in a header of the response message and the subsequent message, respectively. The first message, the response message, and the subsequent message may be Session Initiation Protocol (SIP) messages. Generating the response message may include incorporating one or more rules for the SBC to act upon. The one or more rules may be incorporated in a rule header of the response message. Generating the response message may include incorporating one or more instructions to be passed by the SBC to another entity involved in the call. Generating the response message may include incorporating information, in the response message, for use in generating a final call detail record (CDR), if the event is a disconnect event.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
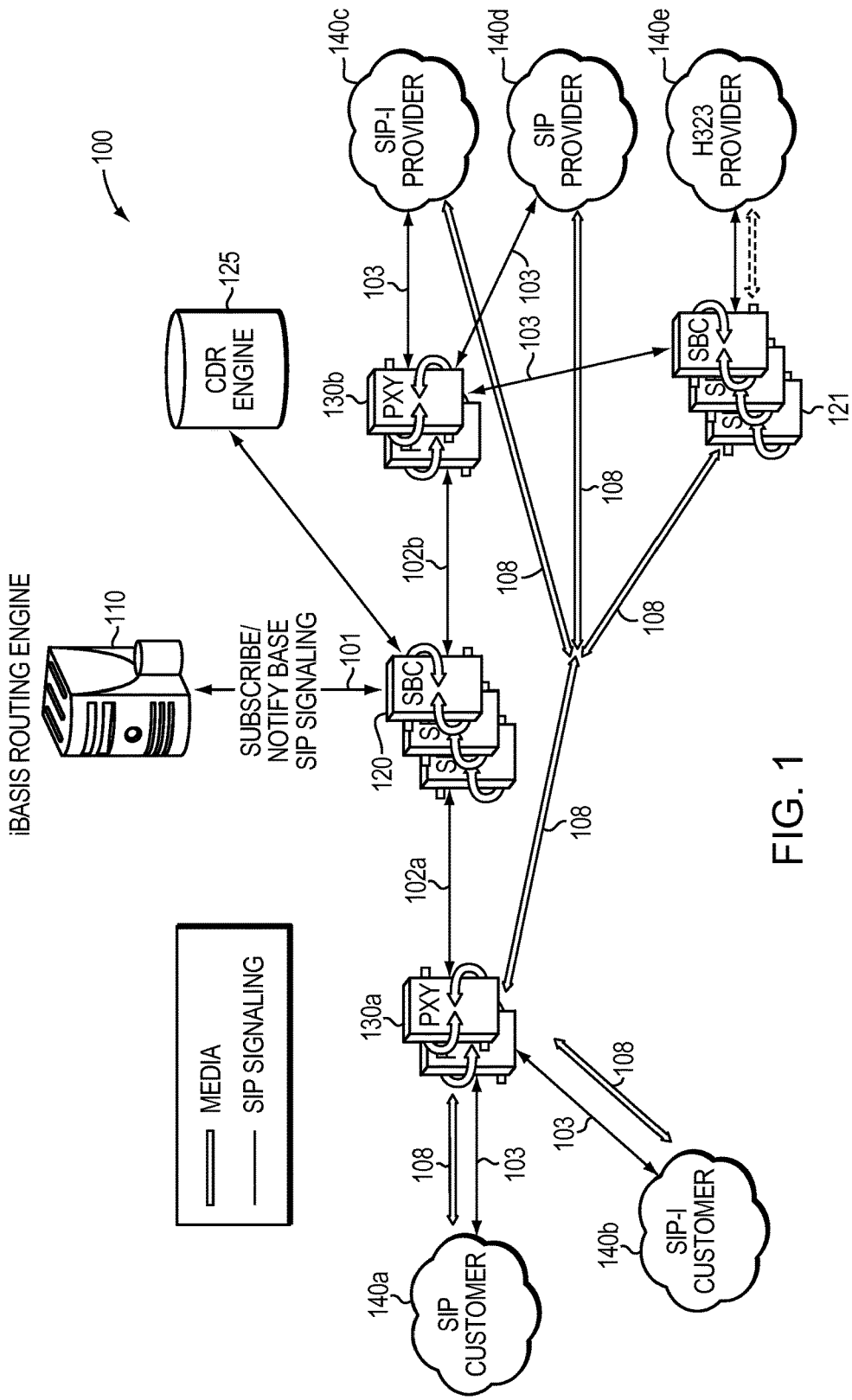
FIG. 1 is a block diagram illustrating a routing system architecture, according to at least one example embodiment.

FIG. 1 is a block diagram illustrating a routing system architecture, according to at least one example embodiment. The routing system 100 includes at least one routing engine (RE) 110 and at least one routing session boarder controller (SBC) 120. The RE 110 and the SBC 120 communicate with each other through a signaling link 101. The routing system 100 may also include at least one call detail record (CDR) engine 125 coupled to the SBC 120 through a signaling communication link 105. The SBC 120 is also coupled to one or more proxy servers 130a-b through one or more respective signaling communication links 102a-b. Each proxy server, e.g., 130a or 130b, is coupled to a customer 140a, 140b to a provider network 140c-d or to an SBC 121 associated with a provider network 140e, through signaling communication links 103. Furthermore, media data links 108 allow exchange of media data between the SBC 120 and the customers 140a, 140b and provider networks 140c-d.

In typical communication systems, signaling over the links 102a-b and 103 may be based on the session initiation protocol (SIP). However, the RE 110 and the SBC 120 may employ a communication interface based on the H323 or SS7 protocols, known in the art, to communicate with each other across the signaling link 101. Because SIP is commonly used over the links 102a-b and 103 in the signaling between the SBC 120 and provider networks, converting SIP-based signaling, at the SBC 120, into H323-based signaling for communication with the RE 110 causes interoperability issues. Such interoperability issues may result in many features not being supported by the routing system 100.

In addition, in conventional routing systems, the SBC 120 usually sends a route request to the RE 110, and the RE 110 responds with a list of possible routes or respective provider networks to be signaled by the SBC 120. The RE 110 also maintains state information related to call(s) managed by the same RE 110. In other words, a conventional RE typically operates in state-full mode by keeping track of at least a previous call state for each on-going call managed by the RE. Usually a database shared between different REs is used to store call related data so that if a first RE is down, or not responding, another RE may still access state information associated with a call previously managed by the first RE. However, maintaining a synchronized database serving a plurality of REs represents an implementation challenge.

According to at least one example embodiment described herein, a SIP interface is employed at the RE 110 and SIP-based signaling is used over the communication link 101 between the SBC 120 and the RE 110, therefore avoiding protocol interworking associated with conventional routing systems. The employed SIP-interface at the RE 110 may support basic SIP and its variants like SIP-I, SIP-IMS, or the like.

According to at least one other example embodiment, a signaling mechanism is employed between the RE 110 and the SBC 120, allowing the RE 120 to have access to call state information without storing and maintaining such information. Specifically, upon receiving a session related message from the SBC 120, the RE 110 sends back, in a response message to the SBC 120, the information received in the session related message as well as instructions or new information generated by the RE 110 to the SBC 120. The SBC 120 stores and maintains session, or call, related information in the received response message. The stored information is then sent back in a following call related message to the RE 110, therefore providing the RE 110 with access to information for use in making decision when managing a call session.

As further described herein below, the employed signaling mechanism enables the routing system to support capabilities and features supported in conventional routing systems as well as new capabilities and features not supported in conventional routing systems.

Figure 2A:
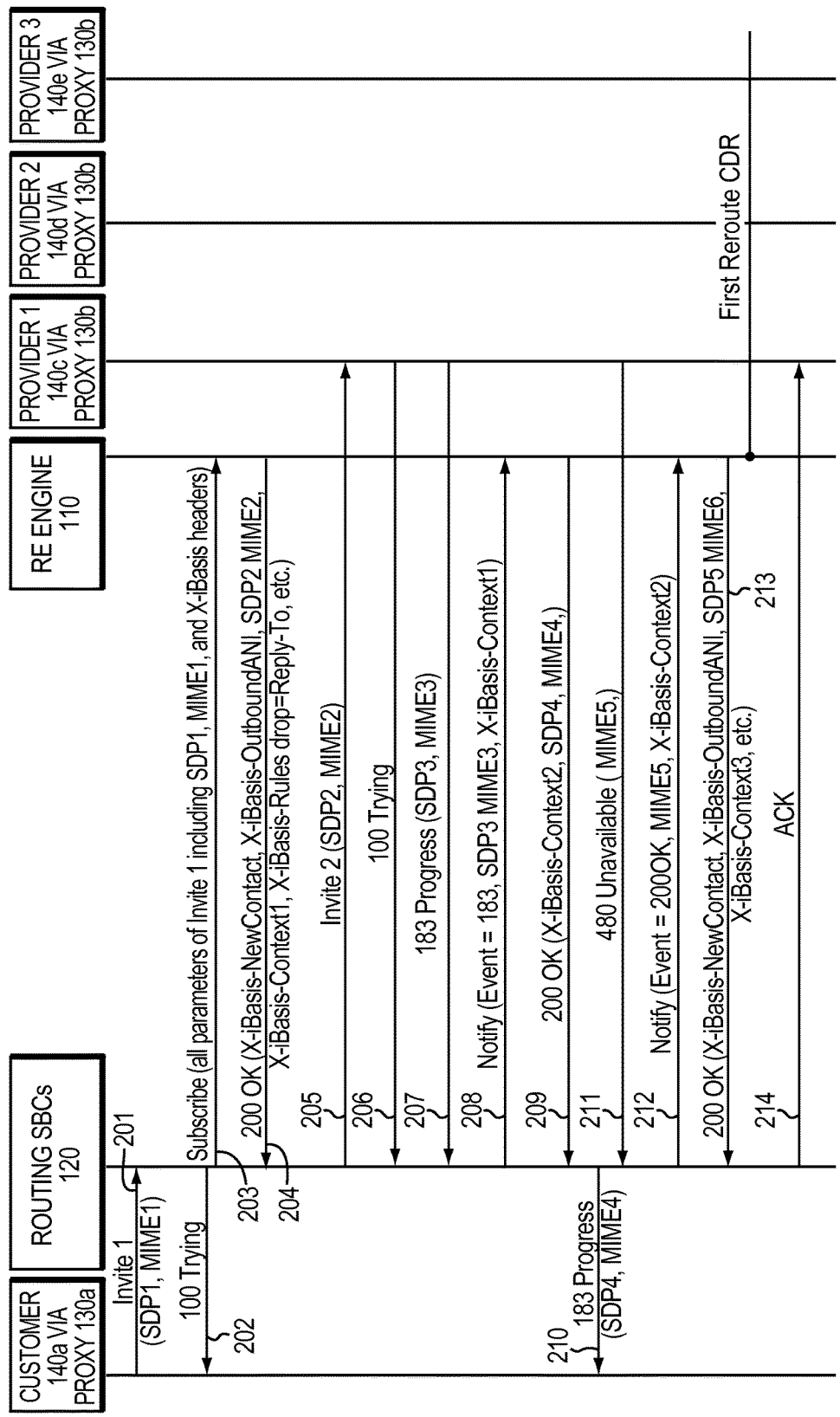
FIGS. 2A-2C illustrate a signaling process for initiating and managing an example call session, according to at least one example embodiment.
Figure 2B:
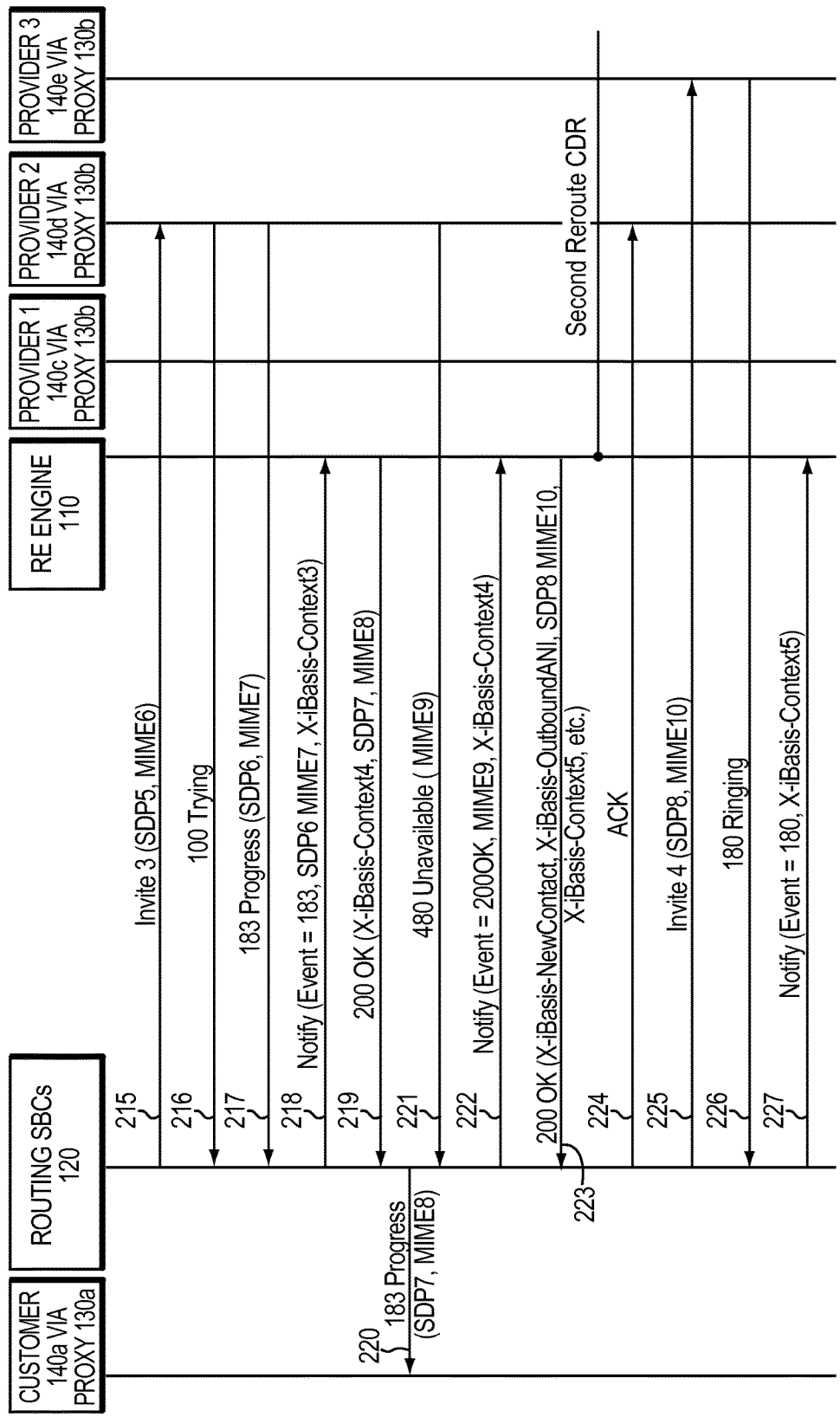
Figure 2C:
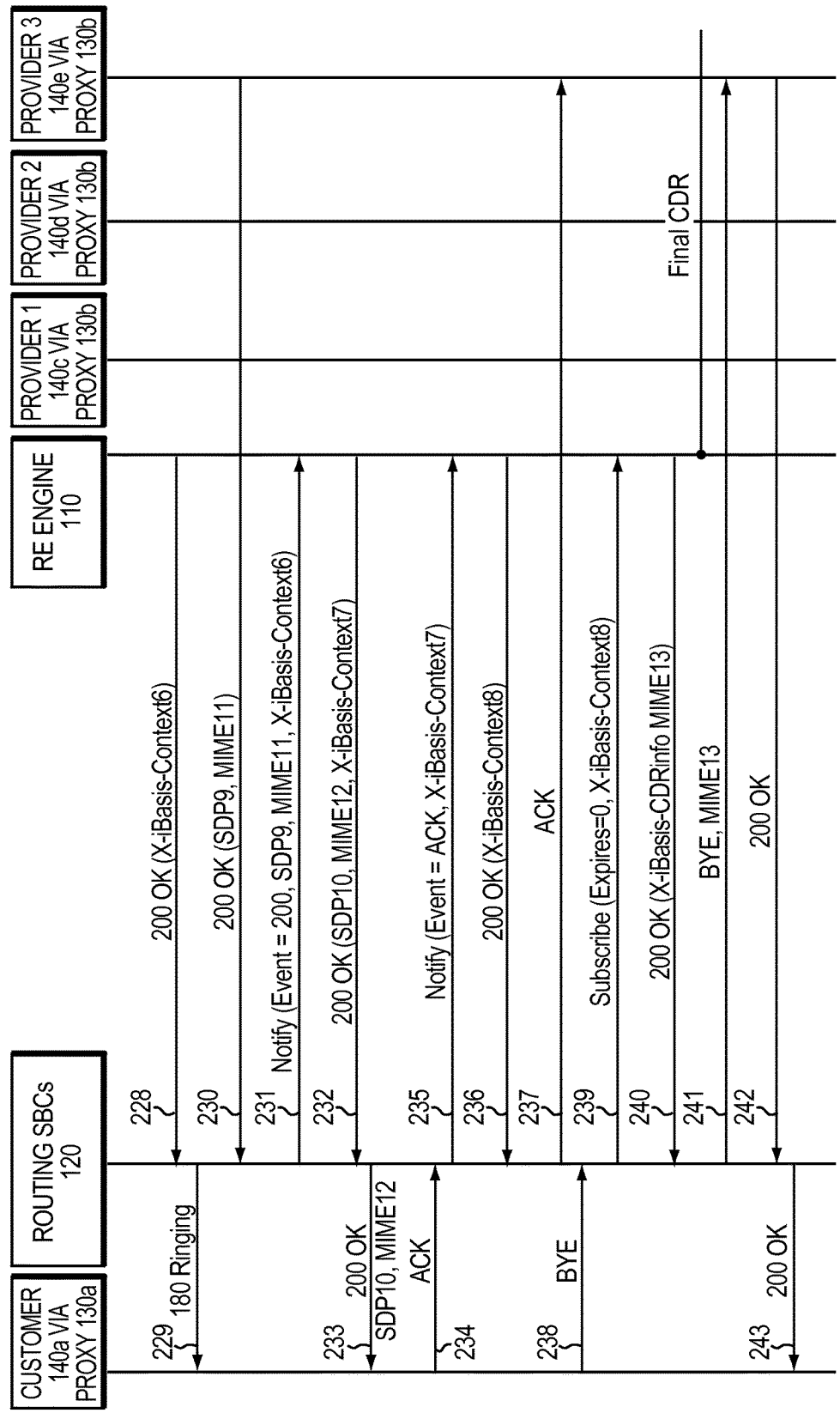

FIGS. 2A-2C illustrate a signaling process for initiating and managing an example call session, according to at least one example embodiment. The SBC 120 receives a SIP Invite message 201 from a proxy server, e.g., 130b. A SIP Trying message 202 is returned to the proxy server by the SBC 120. Attributes from the incoming Invite message are passed by the SBC 120 to the RE 110 in a route request message 203. According to at least one example embodiment, the route request message 203 is a SIP Subscribe message including all parameters from the Invite message 201. In particular, any multipurpose internet mail extensions (MIME) attachment and any session description protocol (SDP) message received in the invite message 201 is included in the Subscribe message 203. According to at least one example scenario, each request towards the RE 110 carries all MIME, or other, attachment and SDP session descriptions received at the SBC 120 from any other entity, e.g., 130a-b, 121, or 140a-e, involved in the call.

According to at least one example embodiment, the Subscribe message, e.g., 203, includes a copy of the Invite message 201 received at the SBC 120 from the incoming leg, e.g., 102a or 102b. Specifically, some information in the Invite message 201 is incorporated with no modification into the Subscribe message 203. Some other information in the Invite message 201 may be modified, for example, by replacing host address information with the SBC address before being included in the Subscribe message. For example, in the Appendix showing example SIP messages illustrating signaling associated with a call session, the Contact and Via headers in the first Invite message are modified when passed to the Subscribe message. However, other headers such as the To and From headers are copied without any modification to the Subscribe message. The Subscribe may further include vendor-specific headers, e.g., "X-iBasis-OrigContact," "X-iBasis-OrigRURI," and "X-iBasis-OrigVia," to carry the original Contact, Via, and R-URI information in the Invite message. The Subscribe message may also include other vendor-specific headers such as "X-iBasis-CustCallID" indicative of the customer call ID in the Invite message, "X-iBasis-CustIP" indicative of the customer IP address in the Invite message, "X-iBasis-CustVIA," and "X-iBasis-CallType," which is populated based on the SDP.

In the case a call is torn down by the SBC 120, the Subscribe message includes expires=0 and the session state is indicated as terminated. The respective error may be indicated in a vendor-specific header in the Subscribe message.

Upon receiving the Subscribe message 203, the RE 110 determines a route for the call based on at least part of the information received in the Subscribe message 203. The RE 110 then generates and sends back a response message 204 to the SBC 120. According to at least one example embodiment, the response message 204 is a SIP response message 200OK. The response message 204, e.g., 200OK message, carries information which may be used to route the call to a termination endpoint and perform functions such as translations of automatic number identification (ANI), dialed number identification service (DNIS), or routing domain number (RDN). Such information may include information used to generate a final call detail record (CDR).

For example, the 200OK message 204 includes a vendor-specific header, e.g., "X-iBasis-NewContact" carrying the route information and is used to create the R-URI for outgoing Invite message 205. The 200OK message 204 may also carry another vendor-specific header, e.g., "X-iBasis-OutboundANI" having the translation for calling number, or A number, to be inserted in the outgoing P-Asserted-Identity/From headers. The 200OK message 204 also includes a vendor-specific context header, e.g., "X-iBasis-Context" carrying context information of the call. The context header may also carry vendor-specific information. The context header may not be decoded or parsed by the SBC 120. The context header, however, is to be returned back to the RE 110 in a subsequent message, e.g., 208 related to the same call. The 200OK message 204 may also include another vendor-specific header, e.g., "X-iBasis-CauseValue," to carry any SIP error, if any, to be sent back to the customer and also written in the final CDR. Any MIME attachments or SDP are to be sent on the SIP session layer to the call endpoint to which the Invite message 205 is to be sent. For example, MIME1 and SDP1 sent in the Invite message 201 are forwarded in the Subscribe message 203 and the RE 110 includes MIME2 and SDP2 in the 200OK message 204. At the SBC 120, MIME2 and SDP2 are sent in the Invite message 205 to provider network 140.

At the SBC 120, the provider network 140a to which the Invite message 205 is forwarded is determined based on the route information received in the response message 204 from the RE 110, e.g., in the "X-iBasis-NewContact" header. The Invite message 205 is then sent to the provider network 140a, which responds back to the SBC 120 with message 207 indicating the use of SDP3 and MIME3 attachment instead of SDP2 and MIME2 indicated in the Invite message 205. The SBC 120 then notifies 208 the RE 110 of the response received from the provider network 140a. For example, the SIP Notify message 208 is sent from the SBC 120 to the RE 110. The Notify message includes an indication of the type of message received from the provider network 140, e.g., "event=183," the SDP3 and MIME3 proposed by the provider network 140 and the context header, e.g., "X-iBasis-Context1," previously received by the SBC 120 from the RE 110 in the 200OK message 204. The context header enables the RE 110 to access information related to the call without having to maintain it or store it.

The Notify message 208 may include copies of headers from the initial Invite message 201 together with SDP and the last context header. The Notify message may also carry a call state header, e.g., "X-iBasis-CallState," indicative of a last state of the call. It may not carry the original MIME but instead will carry the MIME received in the provider reply, e.g., in the message 207. If a CANCEL message is received, notification will be sent with state Cancelled and MIME copied from that Cancel. The Notify message also carries vendor-specific headers, e.g., "X-iBasis-OrigURI" and "X-iBasis-OrigContact" carrying the true R-URI and Contact from incoming Invite message 201.

The Notify message may further include other vendor-specific headers based on the implementation. For mid call events including ringing, connect and disconnection, the call state header carries the event information back to RE 110. In such a case, the Notify message may carry all headers from the message which triggered the notification, e.g., the message indicating ringing, connection, disconnection, or any other state. The Notify message also carries the MIME received in the event message at the SIP Session layer, e.g., 207, and may also copy the SDP if received. The Notify message may also copy any error Reason header received in the event message.

The RE 110 updates the context header "X-iBasis-Context" based on the event information in the Notify message and generates an updated "X-iBasis-Context," which is sent in another 200OK response message. For example, the Notify 208 "X-iBasis-Context1" is modified and returned in 200OK 209 "X-iBasis-Context2".

The mechanism of exchanging information as described above between the RE and SBC enables the RE to have access to call state information and all call related information needed by the RE to make decisions related to the call. Based on decisions made, the RE 110 can send rules for the SBC to act upon such as instructing the SBC 120 to drop, modify, reject, remove, or convert a message to be sent to an endpoint in the call. For example the incoming Invite message 201 carries header Reply-To. This header is copied into the Subscribe message 203. The 200 OK response message 204 carries X-iBasis-Rule header indicating Reply-To header should be dropped, before sending Invite message 205 to the provider network 140*a*.

According to at least one example embodiment, Provider network errors, e.g. 211, may include Sip Reason header and MIME body containing ISUP, as well as the Sip response code. The reason header, MIME body, and Sip Response code are copied into the Notify 212 sent by SBC 120 to the RE 110. The provider network Sip response code is translated into the X-iBasis-CallState header. The RE 110 may use any of the MIME body, Sip Reason header or X-iBasis-CallState header information to make further routing decisions relating to the current call. For example, the 480 response 211 carries a MIME body including ISUP. The Notify message 212 carries the MIME body and includes the X-iBasis-CallState header. The RE 110 may use this data to make additional routing decisions, and in this example sends 200 OK carrying X-iBasis-NewContact to signal a subsequent routing choice. The same is true for 480 Unavailable 221.

According to at least one example embodiment, the SBC 120 on receipt of any 200 OK from the RE 110 to either a Subscribe 203, or Notify indicating a final response from the Provider network 211 or 221, carrying X-iBasis-NewContact, will send an Invite e.g. 205, 215, or 225 carrying SDP and MIME as received from the RE 110 in the last 200 OK response. In the example, 200 OK 204, carries SDP2 and MIME2, these are copied exactly as received into the Invite 205. The same is true for 200 OK 213 Invite 215 carrying SDP5 and MIME6. The same is true for 200 OK 223 Invite 255 carrying SDP8 and MIME10.

According to at least one example embodiment, the SBC 120 on receipt of any Final Response (2xx, 3xx, 4xx, 5xx, or 6xx) from the provider network, will send a Notify to the RE 110 including the final response code in the X-iBasis-CallState header, Reason header, and any SDP and/or MIME bodies received from the Provider network. In the example, 480 Unavailable 211 carries MIME5, which is copied exactly as received from the Provider network into Notify 212. The same is true for 480 Unavailable 221, which carries MIME9 and Notify 222. The same is true for 200 OK 230 which carries SDP9, MIME11 and Notify 231.

According to at least one example embodiment, the SBC 120 on receipt of any Sip Method ACK from the customer network, will send a Notify to the RE 110 including the event indication in the X-iBasis-CallState header, e.g., ACK 234 and Notify 235.

According to at least one example embodiment, the SBC 120 on sending any Sip Method ACK to the Provider network, e.g., ACK 214, ACK 224, ACK 237, will include any MIME body as received from the RE 110, e.g., 200 OK 236 and ACK 237 do not carry any MIME.

According to at least one example embodiment, the SBC 120 on receipt of any Sip Method BYE from either the customer or the provider networks, will send a Subscribe with Expires=0 to the RE 110 including the event indication in the X-iBasis-CallState header, and any MIME body received from the network, e.g., BYE 238 and Subscribe 239.

According to at least one example embodiment, the SBC 120 on sending any Final Response (2xx, 3xx, 4xx, 5xx, or 6xx) to the customer network will include the Sip response code as received in the last 200 OK from the RE 110 in X-iBasis-CauseValue. Also the SBC 120 will include any Reason header and any MIME body as received from the RE 110.

According to at least one example embodiment, the SBC 120 on sending any BYE message to either the customer or provider network will include any MIME body as received from the RE 110 in the last 200 OK. For example, 200 OK 240 and BYE 241 both carry MIME13.

According to at least one example embodiment, the SBC 120 on receiving any Provisional Response (18x) or 200 OK from the Provider network will include any SDP and/or MIME body exactly as received in the Notify sent to RE 110. For example, 183 Progress 207 and Notify 208 both carry SDP3 and MIME3. Additional examples include 183 Progress 217 and Notify 218 both carry SDP6 and MIME7, 180 Ringing 226 and Notify 227 both do not carry SDP or MIME, 200 OK 230 and Notify 231 both carry SDP9 and MIME11.

According to at least one example embodiment, the SBC 120 on sending any Provisional Response (18x) or 200 OK to the customer network will include any SDP and/or MIME body exactly as received from the RE 110 in the last 200 OK. For example, 200 OK 209 and 183 Progress 210 both carry SDP4 and MIME4. Additional examples, 200 OK 219 and 183 Progress 220 both carry SDP7 and MIME5, 200 OK 228 and 180 Ringing 229 both do not carry SDP or MIME, 200 OK 232 and 200 OK 233 both carry SDP10 and MIME12.

According to at least one example embodiment, the SBC 120 after sending Subscribe with Expires=0 to the RE 110 and receiving 200 OK, e.g., Subscribe 239 and 200 OK 240, forwards any final response (2xx, 3xx, 4xx, 5xx, 6xx) to the appropriate network without RE 110 involvement, e.g., 200 OK 242 and 200 OK 243.

Example SIP messages corresponding to messages 201, 203, 204, 205, 207, 208, 209, 212 and 213 are provided in the Appendix.

While this invention has been particularly shown and described with references to example embodiments thereof, it will be understood by those skilled in the art that various changes in form and details may be made therein without departing from the scope of the invention encompassed by the appended claims.

APPENDIX

Message 201 (INVITE)
Internet Protocol Version 4, Src: 192.168.7.34 (Customer), Dst: 216.168.189.99 (Routing SBC)
User Datagram Protocol, Src Port: sip (5060), Dst Port: sip (5060)
Session Initiation Protocol
    Request-Line: INVITE sip:4119612345678@216.168.189.99:5060 SIP/2.0
    Message Header
    Via: SIP/2.0/UDP 192.168.7.34:5060;branch=z9hG4bK-28108-1-0
    To: Called <sip:4119612345678@216.168.189.99:5060>
    From: Calling <sip:3135551212@192.168.7.34:5060>; tag=28108SIPpTag001
    Call-ID: 1-28108@192.168.7.34
    CSeq: 1 INVITE
    Contact: <sip:3135551212@192.168.7.34:5060; tgrp=1079756511;transport=udp>
    Max-Forwards: 70
    Subject: Test call
    Reply-To: <sip:user@customer>
    Content-Type: multipart/mixed; boundary=level3-boundary
    Content-Length: 388
    MIME-Version: 1.0
    Message Body
    MIME Multipart Media Encapsulation, Type: multipart/mixed, Boundary: "level3-boundary"
    [Type: multipart/mixed]
    First boundary: --level3-boundary\r\n
    Encapsulated multipart part: (application/sdp)
      Content-Type: application/sdp\r\n\r\n
      Session Description Protocol
        Session Description Protocol Version (v): 0
        Owner/Creator, Session Id (o): user1 53655765 2353687637 IN IP4 192.168.7.34
        Session Name (s): -
        Connection Information (c): IN IP4 192.168.7.34
        Time Description, active time (t): 0 0
        Media Description, name and address (m): audio 6000 RTP/AVP 97
        Media Attribute (a): rtpmap:97 CLEARMODE/8000
    Boundary: \r\n--level3-boundary\r\n
    Encapsulated multipart part: (application/isup)
      Content-Type: application/isup; version=itu-t92+; base=itu-t92+\r\n
      Content-Disposition: signal; handling=required\r\n\r\n
      ISDN User Part
        Message type: Initial address (1)
        Nature of Connection Indicators: 0x10
        Forward Call Indicators: 0x2001
        Calling Party's category: 0xc (data call (voice band data))
        Transmission medium requirement: 2 (64 kbit/s unrestricted)
        Called Party Number: 4119612345678
        Pointer to start of optional part: 11
        Calling Party Number: 3135551212
        User service information, (2 bytes length)
        Optional forward call indicators: non-CUG call (128)
        End of optional parameters (0)
    Last boundary: \r\n--level3-boundary-4\n Message 203 (SUBSCRIBE)
Internet Protocol Version 4, Src: 216.168.189.101 (Routing SBC), Dst: 192.168.7.92 (iBasis Routing Engine)
User Datagram Protocol, Src Port: sip (5060), Dst Port: sip (5060)
Session Initiation Protocol
    Request-Line: SUBSCRIBE sip:4119612345678@216.168.189.99:5060 SIP/2.0
    Message Header
    Via: SIP/2.0/UDP 216.168.189.101:5060; branch=z9hG4bKdOqihi305o103b3hv6k1.1
    To: Called <sip:4119612345678@216.168.189.99:5060>
    From: Calling <sip:3135551212@192.168.7.34:5060>; tag=SD8hso602-28108SIPpTag001
    Call-ID: SD8hso601-9ed4d0f05037189c763a4e69ec703621-o6arri1
    CSeq: 1 SUBSCRIBE
    Contact: <sip:3135551212@216.168.189.101:5060; tgrp=1079756511;transport=udp>
    Max-Forwards: 69
    Subject: Test call
    Reply-To: <sip:user@customer>
    Content-Type: multipart/mixed; boundary=level3-boundary
    Content-Length: 388
    MIME-Version: 1.0
    Event: subroute
    X-iBasis-CoreVIA: SIP/2.0/UDP 192.168.7.34:5060; branch=z9hG4bK-28108-1-0
    X-iBasis-OrigContact: <sip:3135551212@192.168.7.34:5060;tgrp=1079756511;transport=udp>
    X-iBasis-OrigRURI: sip:4119612345678@216.168.189.99:5060
    X-iBasis-CallType: CLEARMODE
    Route: <sip:4119612345678@192.168.7.92:5060;1r>
    Message Body
    MIME Multipart Media Encapsulation, Type: multipart/mixed, Boundary: "level3-boundary"
    [Type: multipart/mixed]
    First boundary: --level3-boundary\r\n
    Encapsulated multipart part: (application/sdp)
      Content-Type: application/sdp\r\n\r\n
      Session Description Protocol
      Session Description Protocol Version (v): 0
      Owner/Creator, Session Id (o): user1 53655765 2353687637 IN IP4 192.168.7.34
      Session Name (s): -
      Connection Information (c): IN IP4 192.168.7.34
      Time Description, active time (t): 0 0
      Media Description, name and address (m): audio 6000 RTP/AVP 97
      Media Attribute (a): rtpmap:97 CLEARMODE/8000
    Boundary: \r\n--level3-boundary\r\n
    Encapsulated multipart part: (application/isup)
      Content-Type: application/isup; version=itu-t92+; base=itu-t92+\r\n
      Content-Disposition: signal; handling=required\r\n\r\n
      ISDN User Part
        Message type: Initial address (1)
        Nature of Connection Indicators: 0x10
        Forward Call Indicators: 0x2001

Calling Party's category: 0xc (data call (voice band data))
Transmission medium requirement: 2 (64 kbit/s unrestricted)
Called Party Number: 4119612345678
Pointer to start of optional part: 11
Calling Party Number: 3135551212
User service information, (2 bytes length)
Optional forward call indicators: non-CUG call (128)
End of optional parameters (0)
Last boundary: \r\n--level3-boundary-4\n Message 204 (200 OK)
Internet Protocol Version 4, Src: 192.168.7.92 (iBasis Routing Engine), Dst: 216.168.189.101 (Routing SBC)
User Datagram Protocol, Src Port: sip (5060), Dst Port: sip (5060)
Session Initiation Protocol
Status-Line: SIP/2.0 200 OK
Message Header
Via: SIP/2.0/UDP 216.168.189.101:5060; branch=z9hG4bKdOqihi305o103b3hv6k1.1
From: Calling <sip:3135551212@192.168.7.34:5060>; tag=SD8hso602-28108SIPpTag001
To: Called <sip:4119612345678@216.168.189.99:5060>;tag=tag30750
Call-ID: SD8hso601-9ed4d0f05037189c763a4e69ec703621-o6arri1
CSeq: 1 SUBSCRIBE
Contact: <sip:CS-SIP-AQRBUR24-01@192.168.7.92:5060;transport=udp>
X-iBasis-NewContact: <sip:09834A4119612345@192.168.7.93:5060>
X-iBasis-OutboundANI: 3135551212
[truncated] X-iBasis-Context: 1394455737;1394455737; SD8hso601-9ed4d0f05037189c763a4e69ec703621-o6arri1;SD8hso602-28108SIPpTag001;tag30750;1;1; 3135551212;4119612345678;10788;1079756511; 11073;15098 34501;1509834501;3135551212; 4119612345;31355
X-iBasis-CDRInfo: 1079756511;1079756511; 3135551212;4119612345678;623;31713028;1;2; 3135551212;411961 2345;;;;;1509834501; 3135551212;09834A4119612345;;0;0;SD8hso601-9ed4d0f05037189c763a4e69ec703621-o6arri1; 0;;;;;;;;;;;;2;
X-iBasis-Rules: drop=Reply-To
Content-Type: multipart/mixed; boundary=level3-boundary
Content-Length: 388
Message Body
MIME Multipart Media Encapsulation, Type: multipart/mixed, Boundary: "level3-boundary"
 [Type: multipart/mixed]
 First boundary: --level3-boundary\r\n
 Encapsulated multipart part: (application/sdp)
  Content-Type: application/sdp\r\n\r\n
  Session Description Protocol
   Session Description Protocol Version (v): 0
   Owner/Creator, Session Id (o): user1 53655765 2353687637 IN IP4 192.168.7.34
   Session Name (s): -
   Connection Information (c): IN IP4 192.168.7.34
   Time Description, active time (t): 0 0
   Media Description, name and address (m): audio 6000 RTP/AVP 97
   Media Attribute (a): rtpmap:97 CLEARMODE/8000
 Boundary: \r\n--level3-boundary\r\n
 Encapsulated multipart part: (application/isup)
  Content-Type: application/isup; version=itu-t92+; base=itu-t92+\r\n
  Content-Disposition: signal; handling=required\r\n\r\n
  ISDN User Part
   Message type: Initial address (1)
   Nature of Connection Indicators: 0x10
   Forward Call Indicators: 0x2001
   Calling Party's category: 0xc (data call (voice band data))
   Transmission medium requirement: 2 (64 kbit/s unrestricted)
   Called Party Number: 4119612345678
   Pointer to start of optional part: 11
   Calling Party Number: 3135551212
   User service information, (2 bytes length)
   Optional forward call indicators: non-CUG call (128)
   End of optional parameters (0)
 Last boundary: \r\n--level3-boundary-4\n Message 205 (INVITE)
Internet Protocol Version 4, Src: 216.168.189.101 (Routing SBC), Dst: 192.168.7.93 (Provider 1)
User Datagram Protocol, Src Port: sip (5060), Dst Port: sip (5060)
Session Initiation Protocol
Request-Line: INVITE sip:09834A4119612345@192.168.7.93:5060 SIP/2.0
Message Header
Via: SIP/2.0/UDP 216.168.189.101:5060; branch=z9hG4bKegOkjr3058915bbp2771.1
To: Called <sip:4119612345678@216.168.189.99:5060>
From: Anonymous<sip:anonymous@anonymous.invalid:5060>;tag=SD8hso601-28108SIPpTag001
Call-ID: SD8hso601-428e2cda9b25067ec521a5818f14a664-o6arri1
CSeq: 1 INVITE
Contact: <sip:3135551212@216.168.189.101:5060; tgrp=1079756511;transport=udp>
Max-Forwards: 69
Subject: Test call
Content-Type: multipart/mixed; boundary=level3-boundary
Content-Length: 388
MIME-Version: 1.0
P-Asserted-Identity: 3135551212
Route: <sip:4119612345678@216.168.189.99:5060>
Message Body
MIME Multipart Media Encapsulation, Type: multipart/mixed, Boundary: "level3-boundary"
 [Type: multipart/mixed]
 First boundary: --level3-boundary\r\n
 Encapsulated multipart part: (application/sdp)
  Content-Type: application/sdp\r\n\r\n
  Session Description Protocol
   Session Description Protocol Version (v): 0
   Owner/Creator, Session Id (o): user1 53655765 2353687637 IN IP4 192.168.7.34
   Session Name (s): -
   Connection Information (c): IN IP4 192.168.7.34
   Time Description, active time (t): 0 0
   Media Description, name and address (m): audio 6000 RTP/AVP 97

Media Attribute (a): rtpmap:97 CLEARMODE/ 8000
Boundary: \r\n--level3-boundary\r\n
Encapsulated multipart part: (application/isup)
  Content-Type: application/isup; version=itu-t92+; base=itu-t92+\r\n
  Content-Disposition: signal; handling=required\r\n\r\n
  ISDN User Part
    Message type: Initial address (1)
    Nature of Connection Indicators: 0x10
    Forward Call Indicators: 0x2001
    Calling Party's category: 0xc (data call (voice band data))
    Transmission medium requirement: 2 (64 kbit/s unrestricted)
    Called Party Number: 4119612345678
    Pointer to start of optional part: 11
    Calling Party Number: 3135551212
    User service information, (2 bytes length)
    Optional forward call indicators: non-CUG call (128)
    End of optional parameters (0)
Last boundary: \r\n--level3-boundary-4\n
Message 207 (183 PROGRESS)
Internet Protocol Version 4, Src: 192.168.7.93 (Provider 1), Dst: 216.168.189.101 (Routing SBC)
User Datagram Protocol, Src Port: sip (5060), Dst Port: sip (5060)
Session Initiation Protocol
  Status-Line: SIP/2.0 183 Progress
  Message Header
  Via: SIP/2.0/UDP 216.168.189.101:5060; branch=z9hG4bKegOkjr3058915bbp2771.1
  From: Anonymous<sip:anonymous@anonymous.invalid: 5060>;tag=SD8hso601-28108SIPpTag001
  To: Called <sip:4119612345678@216.168.189.99: 5060>;tag=21908SIPpTag012
  Call-ID: SD8hso601-428e2cda9b25067ec521a5818f14a664-o6arri1
  CSeq: 1 INVITE
  Contact: <sip:192.168.7.93:5060;transport=UDP>
  Content-Type: application/sdp
  Content-Length: 142
  Message Body
  MIME Multipart Media Encapsulation, Type: multipart/mixed, Boundary: "level3-boundary"
  [Type: multipart/mixed]
  First boundary: --level3-boundary\r\n
  Encapsulated multipart part: (application/sdp)
    Content-Type: application/sdp\r\n\r\n
    Session Description Protocol
      Session Description Protocol Version (v): 0
      Owner/Creator, Session Id (o): user1 53655765 2353687637 IN IP4 192.168.7.93
      Session Name (s): -
      Connection Information (c): IN IP4 192.168.7.93
      Time Description, active time (t): 0 0
      Media Description, name and address (m): audio 6000 RTP/AVP 97
      Media Attribute (a): rtpmap:97 CLEARMODE/ 8000
  Boundary: \r\n--level3-boundary\r\n
  Encapsulated multipart part: (application/isup)
    Content-Type: application/isup; version=itu-t92+; base=itu-t92+\r\n
    Content-Disposition: signal; handling=required\r\n\r\n
    ISDN User Part
      Message type: Address complete (6)
      Backward Call Indicators: 0x1234
      Pointer to start of optional part: 1
      Optional backward call indicators: 0x0
      Parameter compatibility information (2 bytes length)
      Echo control information: 0x10
      End of optional parameters (0)
Last boundary: \r\n--level3-boundary-4\n
Message 208 (NOTIFY)
Internet Protocol Version 4, Src: 216.168.189.101 (Routing SBC), Dst: 192.168.7.92 (iBasis Routing Engine)
User Datagram Protocol, Src Port: sip (5060), Dst Port: sip (5060)
Session Initiation Protocol
  Request-Line: NOTIFY sip:CS-SIP-AQRBUR24-01@192.168.7.92:5060;transport=udp SIP/2.0
  Message Header
  Via: SIP/2.0/UDP 216.168.189.101:5060; branch=z9hG4bKe07p1400d8r08b3h47d1
  To: Called <sip:4119612345678@216.168.189.99: 5060>;tag=tag30750
  From: Calling <sip:3135551212@192.168.7.34:5060>; tag=SD8hso602-28108SIPpTag001
  Call-ID: SD8hso601-9ed4d0f05037189c763a4e69ec703621-o6arri1
  CSeq: 2 NOTIFY
  Contact: <sip:3135551212@216.168.189.101:5060; tgrp=1079756511;transport=udp>
  Max-Forwards: 69
  Subject: Test call
  Content-Type: application/sdp
  Content-Length: 142
  MIME-Version: 1.0
  Event: subroute
  X-iBasis-CoreVIA: SIP/2.0/UDP 192.168.7.34:5060; branch=z9hG4bK-28108-1-0
  X-iBasis-OrigContact: <sip:3135551212@192.168.7.34: 5060;tgrp=1079756511;transport=udp>
  X-iBasis-OrigRURI: sip:4119612345678@216.168.189.99:5060
  X-iBasis-CallType: CLEARMODE [truncated] X-iBasis-Context: 1394455737;1394455737;SD8hso601-9ed4d0f05037189c763a4e69ec703621-o6arri1; SD8hso602-28108SIPpTag001;tag30750;1;1; 3135551212;4119612345678;10788;1079756511; 11073;15098 34501;1509834501;3135551212; 4119612345;31355
  X-iBasis-CallState: Setup-183-Progress
  Subscription-State: active;expires=60
  Message Body
  MIME Multipart Media Encapsulation, Type: multipart/mixed, Boundary: "level3-boundary"
  [Type: multipart/mixed]
  First boundary: --level3-boundary\r\n
  Encapsulated multipart part: (application/sdp)
    Content-Type: application/sdp\r\n\r\n
    Session Description Protocol
      Session Description Protocol Version (v): 0
      Owner/Creator, Session Id (o): user1 53655765 2353687637 IN IP4 192.168.7.93
      Session Name (s): -
      Connection Information (c): IN IP4 192.168.7.93
      Time Description, active time (t): 0 0

Media Description, name and address (m): audio 6000 RTP/AVP 97
   Media Attribute (a): rtpmap:97 CLEARMODE/8000
 Boundary: \r\n--level3-boundary\r\n
 Encapsulated multipart part: (application/isup)
   Content-Type: application/isup; version=itu-t92+; base=itu-t92+\r\n
   Content-Disposition: signal; handling=required\r\n\r\n
   ISDN User Part
     Message type: Address complete (6)
     Backward Call Indicators: 0x1234
     Pointer to start of optional part: 1
     Optional backward call indicators: 0x0
     Parameter compatibility information (2 bytes length)
     Echo control information: 0x10
     End of optional parameters (0)
   Last boundary: \r\n--level3-boundary-4\n
Message 209 (200 OK)
Internet Protocol Version 4, Src: 192.168.7.92 (iBasis Routing Engine), Dst: 216.168.189.101 (Routing SBC)
User Datagram Protocol, Src Port: sip (5060), Dst Port: sip (5060)
Session Initiation Protocol
  Status-Line: SIP/2.0 200 OK
  Message Header
  Via: SIP/2.0/UDP 216.168.189.101:5060; branch=z9hG4bKe07p1400d8r08b3h47d1
  From: Calling <sip:3135551212@192.168.7.34:5060>; tag=SD8hso602-28108SIPpTag001
  To: Called <sip:4119612345678@216.168.189.99:5060>;tag=tag30750
  Call-ID: SD8hso601-9ed4d0f05037189c763a4e69ec703621-o6arri1
  CSeq: 2 NOTIFY
  Contact: <sip:CS-SIP-AQRBUR24-01@192.168.7.92:5060;transport=udp>
  [truncated] X-iBasis-Context: 1394455737;1394455737; SD8hso601-9ed4d0f05037189c763a4e69ec703621-o6arri1;SD8hso602-28108SIPpTag001;tag30750;2;2; 3135551212;4119612345678;10788;1079756511; 11073;15098 34501;1509834501;3135551212; 4119612345;31355
  [truncated] X-iBasis-CDRInfo: 1079756511; 1079756511;3135551212;4119612345678;623; 31713028;1;2;3135551212;411961 2345;;;;; 1509834501;3135551212;09834A4119612345;;0;0; SD8hso601-9ed4d0f05037189c763a4e69ec703621-o6arri1;0;;12:48:58.110 GMT Mar
  Content-Type: application/sdp
  Content-Length: 142
  Message Body
  MIME Multipart Media Encapsulation, Type: multipart/mixed, Boundary: "level3-boundary"
    [Type: multipart/mixed]
    First boundary: --level3-boundary\r\n
    Encapsulated multipart part: (application/sdp)
      Content-Type: application/sdp\r\n\r\n
      Session Description Protocol
        Session Description Protocol Version (v): 0
        Owner/Creator, Session Id (o): user1 53655765 2353687637 IN IP4 192.168.7.93
        Session Name (s): -
        Connection Information (c): IN IP4 192.168.7.93
        Time Description, active time (t): 0 0

Media Description, name and address (m): audio 6000 RTP/AVP 97
   Media Attribute (a): rtpmap:97 CLEARMODE/8000
 Boundary: \r\n--level3-boundary\r\n
 Encapsulated multipart part: (application/isup)
   Content-Type: application/isup; version=itu-t92+; base=itu-t92+\r\n
   Content-Disposition: signal; handling=required\r\n\r\n
   ISDN User Part
     Message type: Address complete (6)
     Backward Call Indicators: 0x1234
     Pointer to start of optional part: 1
     Optional backward call indicators: 0x0
     Parameter compatibility information (2 bytes length)
     Echo control information: 0x10
     End of optional parameters (0)
   Last boundary: \r\n--level3-boundary-4\n
Message 212 (NOTIFY)
Internet Protocol Version 4, Src: 216.168.189.101 (Routing SBC), Dst: 192.168.7.92 (iBasis Routing Engine)
User Datagram Protocol, Src Port: sip (5060), Dst Port: sip (5060)
Session Initiation Protocol
  Request-Line: NOTIFY sip:CS-SIP-AQRBUR24-01@192.168.7.92:5060;transport=udp SIP/2.0
  Message Header
  Via: SIP/2.0/UDP 216.168.189.101:5060; branch=z9hG4bKfgdq7e00d8ug3b3hm620
  To: Called <sip:4119612345678@216.168.189.99:5060>;tag=tag30750
  From: Calling <sip:3135551212@192.168.7.34:5060>; tag=SD8hso602-28108SIPpTag001
  Call-ID: SD8hso601-9ed4d0f05037189c763a4e69ec703621-o6arri1
  CSeq: 3 NOTIFY
  Contact: <sip:3135551212@216.168.189.101:5060; tgrp=1079756511;transport=udp>
  Max-Forwards: 69
  Subject: Test call
  Content-Length: 8
  Content-Type: application/isup; version=itu-t92+; base=itu-t92+
  Event: subroute
  X-iBasis-CoreVIA: SIP/2.0/UDP 192.168.7.34:5060; branch=z9hG4bK-28108-1-0
  X-iBasis-OrigContact: <sip:3135551212@192.168.7.34:5060;tgrp=1079756511;transport=udp>
  X-iBasis-OrigRURI: sip:4119612345678@216.168.189.99:5060
  X-iBasis-CallType: CLEARMODE
  [truncated] X-iBasis-Context: 1394455737;1394455737; SD8hso601-9ed4d0f05037189c763a4e69ec703621-o6arri1;SD8hso602-28108SIPpTag001;tag30750;2;2; 3135551212;4119612345678;10788;1079756511; 11073;15098 34501;1509834501;3135551212; 4119612345;31355
  X-iBasis-CallState: Failed-480-Temporarily Unavailable; Release Source=Called
  Subscription-State: active;expires=60
  Content-Disposition: signal; handling=required
  Message Body
  ISDN User Part
    Message type: Release (12)
    Cause indicators, see Q.850 (2 bytes length)

No optional parameter present (Pointer: 0)
Message 213 (200 OK)
Internet Protocol Version 4, Src: 192.168.7.92 (iBasis Routing Engine), Dst: 216.168.189.101 (Routing SBC)
User Datagram Protocol, Src Port: sip (5060), Dst Port: sip (5060)
Session Initiation Protocol
  Status-Line: SIP/2.0 200 OK
  Message Header
    Via: SIP/2.0/UDP 216.168.189.101:5060; branch=z9hG4bKfgdq7e00d8ug3b3hm620
    From: Calling <sip:3135551212@192.168.7.34:5060>; tag=SD8hso602-28108SIPpTag001
    To: Called <sip:4119612345678@216.168.189.99:5060>;tag=tag30750
    Call-ID: SD8hso601-9ed4d0f05037189c763a4e69ec703621-o6arri1
    CSeq: 3 NOTIFY
    Contact: <sip:CS-SIP-AQRBUR24-01@192.168.7.92:5060;transport=udp>
    X-iBasis-NewContact: <sip:09635A4119612345@216.168.189.184:5060>
    X-iBasis-OutboundANI: 3135551212
    [truncated] X-iBasis-Context: 1394455737;1394455737;SD8hso601-9ed4d0f05037189c763a4e69ec703621-o6arri1;SD8hso602-28108SIPpTag001;tag30750;2;3;3135551212;4119612345678;10788;1079756511;10832;15096 35501;1509635501;3135551212;4119612345;31355
    [truncated] X-iBasis-CDRInfo: 1079756511;1079756511;3135551212;4119612345678;623;31713028;2;2;3135551212;411961 2345;;;;;1509635501;3135551212;09635A4119612345;;0;0;SD8hso601-9ed4d0f05037189c763a4e69ec703621-o6arri1;0;;12:48:58.110 GMT Mar
    Content-Type: multipart/mixed; boundary=level3-boundary
    Content-Length: 388
    MIME-Version: 1.0
  Message Body
    MIME Multipart Media Encapsulation, Type: multipart/mixed, Boundary: "level3-boundary"
    [Type: multipart/mixed]
    First boundary: --level3-boundary\r\n
    Encapsulated multipart part: (application/sdp)
      Content-Type: application/sdp\r\n\r\n
      Session Description Protocol
        Session Description Protocol Version (v): 0
        Owner/Creator, Session Id (o): user1 53655765 2353687637 IN IP4 192.168.7.34
        Session Name (s): -
        Connection Information (c): IN IP4 192.168.7.34
        Time Description, active time (t): 0 0
        Media Description, name and address (m): audio 6000 RTP/AVP 97
        Media Attribute (a): rtpmap:97 CLEARMODE/8000
    Boundary: \r\n--level3-boundary\r\n
    Encapsulated multipart part: (application/isup)
      Content-Type: application/isup; version=itu-t92+; base=itu-t92+\r\n
      Content-Disposition: signal; handling=required\r\n\r\n
    ISDN User Part
      Message type: Initial address (1)
      Nature of Connection Indicators: 0x10
      Forward Call Indicators: 0x2001
      Calling Party's category: 0xc (data call (voice band data))
      Transmission medium requirement: 2 (64 kbit/s unrestricted)
      Called Party Number: 4119612345678
      Pointer to start of optional part: 11
      Calling Party Number: 3135551212
      User service information, (2 bytes length)
      Optional forward call indicators: non-CUG call (128)
      End of optional parameters (0)
    Last boundary: \r\n--level3-boundary-4\n

What is claimed is:

1. A method of managing call routing, the method comprising:

receiving, at a routing engine, a first message from a session border controller (SBC), the first message including event information indicative of an event related to a call, the event associated with a second message received by the SBC;

generating, at a routing engine, a response message including call managing information related to the call, the call managing information determined based on at least part of the event information and including call state information about the call, the call managing information including the call state information to be returned to the routing engine by the SBC in a subsequent message related to the call, such that the routing engine has access to the call state information to make a decision about routing the call without having to store or maintain the call state information; and sending, by the routing engine, the response message to the SBC.

2. A method according to claim 1, wherein the call managing information is included in a header of the response message and the subsequent message, respectively.

3. A method according to claim 1, wherein the first message, the response message, and the subsequent message are Session Initiation Protocol (SIP) messages.

4. A method according to claim 1, wherein generating the response message includes incorporating one or more rules for the SBC to act upon.

5. A method according to claim 4, wherein incorporating the one or more rules includes incorporating the one or more rules in a rule header of the response message.

6. A method according to claim 4, wherein the one or more rules include at least one of:

an instruction for the SBC to drop and not forward the second message to an endpoint of the call;

an instruction for the SBC to convert the second message to a message with a different message type and to send the message with a different message type to an endpoint of the call;

an instruction for the SBC to reject the second message;

an instruction for the SBC to modify or insert a header in the second message before sending the second message to an endpoint of the call;

an instruction for the SBC to remove a header in the second message before sending the second message to an endpoint of the call; and an instruction for the SBC to drop the call.

7. A method according to claim 1, wherein generating the response message includes incorporating one or more instructions to be passed by the SBC to another entity involved in the call.

8. A method according to claim 1, wherein generating the response message includes incorporating information, in the response message, for use in generating a final call detail record (CDR), if the event is a disconnect event or error event.

9. A routing engine comprising:
at least one processor; and
at least one memory storing computer code instructions thereon, the at least one processor and the at least one memory, with the computer code instructions, being configured to cause the routing engine to:
receive a first message from a session border controller (SBC), the first message including event information indicative of an event related to a call, the event associated with a second message received by the SBC;
generate a response message including call managing information related to the call, the call managing information determined based on at least part of the event information and including call state information about the call, the call managing information including the call state information to be returned to the routing engine by the SBC in a subsequent message related to the call, such that the routing engine has access to the call state information to make a decision about routing the call without having to store or maintain the call state information; and
send the response message to the SBC.

10. A routing engine according to claim 9, wherein the call managing information is included in a header of the response message and the subsequent message, respectively.

11. A routing engine according to claim 9, wherein the first message and the response message are Session Initiation Protocol (SIP) messages.

12. A routing engine according to claim 9, wherein in generating the response message, the at least one processor and the at least one memory, with the computer code instructions, are configured to cause the routing engine to further incorporate one or more rules for the SBC to act upon.

13. A routing engine according to claim 12, wherein in incorporating the one or more rules, the at least one processor and the at least one memory, with the computer code instructions, are configured to cause the routing engine to incorporate the one or more rules in a rule header of the response message.

14. A routing engine according to claim 12, wherein the one or more rules include at least one of:
an instruction for the SBC to drop and not forward the second message to an endpoint of the call;
an instruction for the SBC to convert the second message to a message with a different message type and to send the message with a different message type to an endpoint of the call;
an instruction for the SBC to reject the second message;
an instruction for the SBC to modify or insert a header in the second message before sending the second message to an endpoint of the call;
an instruction for the SBC to remove a header in the second message before sending the second message to an endpoint of the call; and
an instruction for the SBC to drop the call.

15. A routing engine according to claim 9, wherein in generating the response message, the at least one processor and the at least one memory, with the computer code instructions, are configured to cause the routing engine to further incorporate information, in the response message, for use in generating a final call detail record (CDR), if the event is a disconnect event or error event.

16. A routing engine according to claim 9, wherein in generating the response message, the at least one processor and the at least one memory, with the computer code instructions, are configured to cause the routing engine to further incorporate one or more instructions to be passed by the SBC to another entity involved in the call.

17. A non-transitory computer-readable medium with computer software code stored thereon, the computer software code, when executed by a processor, configured to cause a routing engine to:
receive a first message from a session border controller (SBC), the first message including event information indicative of an event related to a call, the event associated with a second message received by the SBC;
generate a response message including call managing information related to the call, the call managing information determined based on at least part of the event information and including call state information about the call, the call managing information including the call state information to be returned to the routing engine by the SBC in a subsequent message related to the call such that the routing engine has access to the call state information to make a decision about routing the call without having to store or maintain the call state information; and
send the response message to the SBC.

18. A method of managing call routing, the method comprising:
sending a first message by a session border controller (SBC) to a routing engine, the first message including event information indicative of an event related to a call, the event associated with a second message received by the SBC;
receiving, at the SBC, a response message sent from the routing engine, the response message including call managing information related to the call, the call managing information determined based on at least part of the event information and including call state information about the call, the call managing information including the call state information to be returned to the routing engine by the SBC in a subsequent message related to the call; and
maintaining the call managing information received in the response message, the call managing information to be returned to the routing engine in a subsequent message related to the call such that the routing engine has access to the call state information to make a decision about routing the call without having to store or maintain the call state information.

19. A method according to claim 18, wherein the call managing information is included in a header of the response message and the subsequent message, respectively.

20. A method according to claim 18, wherein the first message, the response message, and the subsequent message are Session Initiation Protocol (SIP) messages.

21. A method according to claim 18, wherein the response message includes one or more rules for the SBC to act upon.

22. A method according to claim 21, wherein the one or more rules are incorporated in a rule header of the response message.

23. A method according to claim 21, wherein the one or more rules include at least one of:
an instruction for the SBC to drop and not forward the second message to an endpoint of the call;

an instruction for the SBC to convert the second message to a message with a different message type and to send the message with a different message type to an endpoint of the call;

an instruction for the SBC to reject the second message;

an instruction for the SBC to modify or insert a header in the second message before sending the second message to an endpoint of the call;

an instruction for the SBC to remove a header in the second message before sending the second message to an endpoint of the call; and an instruction for the SBC to drop the call.

24. A method according to claim 18, wherein the response message includes one or more instructions to be passed by the SBC to another entity involved in the call.

25. A method according to claim 18, wherein the response message includes information for use in generating a final call detail record (CDR), if the event is a disconnect event or error event, and the method further comprising forwarding the information for use in generating a final call detail record (CDR) to a CDR engine.

26. Apparatus for managing call routing, the apparatus comprising:
at least one processor; and
at least one memory storing computer code instructions thereon, the at least one processor and the at least one memory, with the computer code instructions, being configured to cause the apparatus to:
send a first message to a routing engine, the first message including event information indicative of an event related to a call, the event associated with a second message received by the apparatus;
receive from the routing engine a response message to the first message, the response message including call managing information related to the call, the call managing information determined based on at least part of the event information and including call state information about the call, the call managing information including the call state information to be returned to the routing engine by the apparatus in a subsequent message related to the call; and
maintain the call managing information received in the response message, the call managing information to be returned to the routing engine in a subsequent message related to the call such that the routing engine has access to the call state information to make a decision about routing the call without having to store or maintain the call state information.

27. Apparatus according to claim 26, wherein the call managing information is included in a header of the response message and the subsequent message, respectively.

28. Apparatus according to claim 26, wherein the first message, the response message, and the subsequent message are Session Initiation Protocol (SIP) messages.

29. Apparatus according to claim 26, wherein the response message includes one or more rules for the apparatus to act upon.

30. Apparatus according to claim 29, wherein the one or more rules are incorporated in a rule header of the response message.

31. Apparatus according to claim 29, wherein the one or more rules include at least one of:
an instruction for the apparatus to drop and not forward the second message to an endpoint of the call;
an instruction for the apparatus to convert the second message to a message with a different message type and to send the message with a different message type to an endpoint of the call;
an instruction for the apparatus to reject the second message;
an instruction for the apparatus to modify or insert a header in the second message before sending the second message to an endpoint of the call;
an instruction for the apparatus to remove a header in the second message before sending the second message to an endpoint of the call; and
an instruction for the apparatus to drop the call.

32. Apparatus according to claim 26, wherein the response message includes one or more instructions to be passed by the apparatus to another entity involved in the call.

33. Apparatus according to claim 26, wherein the response message includes information for use in generating a final call detail record (CDR), if the event is a disconnect event or error event, and the at least one processor and the at least one memory, with the computer code instructions, are configured to cause the apparatus to further forward the information for use in generating a final call detail record (CDR) to a CDR engine.

34. A non-transitory computer-readable medium with computer software code stored thereon, the computer software code, when executed by a processor, configured to cause an apparatus to:
send a first message to a routing engine, the first message including event information indicative of an event related to a call, the event associated with a second message received by the apparatus;
receive from the routing engine a response message to the first message, the response message including call managing information related to the call, the call managing information determined based on at least part of the event information and including call state information about the call, the call managing information including the call state information to be returned to the routing engine by the apparatus in a subsequent message related to the call; and
maintain the call managing information received in the response message, the call managing information to be returned to the routing engine in a subsequent message related to the call such that the routing engine has access to the call state information to make a decision about routing the call without having to store or maintain the call state information.

* * * * *